United States Patent
Jackson et al.

[11] Patent Number: 6,033,338
[45] Date of Patent: Mar. 7, 2000

[54] CONTINUOUSLY VARIABLE TRANSMISSION CONTROL SYSTEM FOR A VEHICLE

[75] Inventors: Neil David Jackson, Wellesbourne; Richard Taylor, Meriden, both of United Kingdom

[73] Assignee: Rover Group Limited, Warwick, United Kingdom

[21] Appl. No.: 09/254,132
[22] PCT Filed: Sep. 17, 1998
[86] PCT No.: PCT/GB98/02831
  § 371 Date: Mar. 2, 1999
  § 102(e) Date: Mar. 2, 1999
[87] PCT Pub. No.: WO99/15814
  PCT Pub. Date: Apr. 1, 1999

[30]   Foreign Application Priority Data

Sep. 24, 1997 [GB]  United Kingdom ............... 9720172

[51] Int. Cl.⁷ .................................. B60K 41/08
[52] U.S. Cl. .................... 477/44; 477/46; 74/336 R
[58] Field of Search ..................... 477/41, 46, 47, 477/48; 74/335, 336 R

[56]    References Cited

U.S. PATENT DOCUMENTS

| | | | |
|---|---|---|---|
| 4,653,005 | 3/1987 | Osanai et al. | 74/866 |
| 5,007,147 | 4/1991 | Imai et al. | 74/866 |
| 5,514,046 | 5/1996 | Petersmann et al. | 477/46 X |
| 5,527,231 | 6/1996 | Seidel | 477/46 |
| 5,527,232 | 6/1996 | Seidel et al. | 477/46 |
| 5,609,544 | 3/1997 | Lardy et al. | 477/46 |
| 5,624,348 | 4/1997 | Lardy et al. | 477/46 |
| 5,655,991 | 8/1997 | Lardy et al. | 477/46 |
| 5,688,204 | 11/1997 | Runge et al. | 477/46 |
| 5,871,417 | 2/1999 | Suzuki | 477/46 X |

FOREIGN PATENT DOCUMENTS

| | | |
|---|---|---|
| 0 426 443 A2 | 5/1991 | European Pat. Off. . |
| 0 519 528 A2 | 12/1992 | European Pat. Off. . |
| 0 681 119 A2 | 11/1995 | European Pat. Off. . |
| 2 699 978 | 7/1994 | France . |
| 43 12 718 A1 | 11/1994 | Germany . |
| 196 09 585 A1 | 9/1997 | Germany . |

*Primary Examiner*—Charles A. Marmor
*Assistant Examiner*—Ha Ho
*Attorney, Agent, or Firm*—Davis and Bujold

[57]    ABSTRACT

A transmission control system for a vehicle 10 is disclosed comprising a continuously variable transmission (CVT) 14 whose transmission ratio is varied by a CVT controller 20. When the selector lever 24 is in drive D, the CVT controller 20 varies the transmission ratio in a continuous manner but, if a stepped down-shift is selected using a down-shift button DS on the steering wheel 36, a hybrid mode may be entered to allow a user to perform stepped down-shifts to provide engine braking. In the hybrid mode, stepped down-shifts can be selected but the vehicle 10 is accelerated by varying the transmission ratio in a continuous manner.

45 Claims, 7 Drawing Sheets

Flow Chart For Return From Hybrid Mode to Continuous Mode

CONTINUOUSLY VARIABLE TRANSMISSION CONTROL SYSTEM FOR A VEHICLE

FIELD OF THE INVENTION

This invention relates to transmission control systems and in particular to a transmission control system for a vehicle having a continuously variable transmission. The invention also relates to: a vehicle including such a transmission control system; a control means for such a transmission control system; and to method of controlling such a transmission control system.

BACKGROUND OF THE INVENTION

It is known to provide a vehicle with a transmission control system to control the operation of a continuously variable transmission (CVT) by varying its transmission ratio in a continuous manner. An increase in transmission ratio causes a decrease in road speed for a given engine speed and a decrease in transmission ratio causes an increase in road speed for a given engine speed.

It is a known advantage of equipping vehicles with a CVT that, by operating the prime mover at its optimum efficiency and varying the transmission ratio in a continuous manner, it is possible to achieve optimum acceleration. It is, however, a known disadvantage of such systems that on over-run, because the transmission ratio is varied in a continuous manner, there is very little engine braking to assist deceleration.

In U.S. Pat. No. 5,527,231 a system is disclosed which detects an over-run condition and provides for a continuous increase in transmission ratio while the brakes are being operated, so as to provide engine braking on over-run to reduce the stress on the service brakes.

In U.S. Pat. No. 5,527,232 a system is disclosed which detects an over-run condition and fixes the transmission ratio at the value it possessed on commencement of over-run, for example, when the accelerator pedal is released rapidly on entry to a bend. This system prevents a decrease in transmission ratio under such circumstances, which would provide little engine braking.

SUMMARY OF THE INVENTION

It is an object of this invention to provide: an improved transmission control system for a vehicle; a vehicle including such a transmission control system; a control means for such a transmission control system; and to provide a method of controlling such a transmission control system.

According to the invention there is provided a transmission control system for a vehicle, the transmission control system comprising a control means arranged in use to be capable of operation in a continuous mode in which it can vary the transmission ratio of a continuously variable transmission in a substantially continuous manner and also arranged in use to be capable of operation in a stepped mode in which it can increase said transmission ratio in steps by substantially stepped down-shifts in response to a manually operable down-shift request means, wherein the control means is further arranged in use to be capable of operation in a hybrid mode in which stepped down-shifts can be made using said manually operable down-shift request means and acceleration of the vehicle is performed in the continuous manner.

It may be possible to enter the hybrid mode only when the control means is operating in the continuous mode and, also or in the alternative, on or after selection by a user of a stepped down-shift while the control means is operating in the continuous mode.

It may also be necessary to satisfy one or more predetermined hybrid mode entry conditions, which may include one or more of: detection of a vehicle speed which is above a predetermined level; determination of a post-entry engine speed which is at least substantially equal to the pre-entry engine speed, whereby there is a reduced likelihood that the engine speed will appear to a user to fall after the hybrid mode is entered and a stepped down-shift is made; and determination of a post-entry engine speed which is below a predetermined level, that level being a level at which the control means is arranged to automatically decrease the transmission ratio, whereby there is a reduced likelihood that the system will automatically leave the hybrid mode shortly after entering it.

The control means may be arranged, after entry to the hybrid mode, to continue to operate in the hybrid mode until one or more predetermined hybrid mode exit conditions is or are satisfied.

The transmission control system may further comprise a manually operable up-shift selection means, wherein an exit condition may include a manual selection by a user of an up-shift. An exit condition may also, or in the alternative, include one or more of: the detection of a vehicle speed which is below a predetermined level; the detection of an engine speed which is above a predetermined level; and the determination of a post-exit engine speed which is higher than the existing engine speed in the hybrid mode.

The control means may be arranged to return automatically to the continuous mode if one or more of the exit conditions is or are satisfied.

The control means may be arranged, after a return to the continuous mode has been initialised, to remain in the simulated fixed ratio in which it is instantly operating at the time that said return is initialised, until that ratio matches a region of a continuous characteristic used in the continuous mode and thereafter to change over to the continuous mode in said region.

After a return to the continuous mode has been initialised, the control means may be arranged to adopt a merging characteristic to merge, into the continuous characteristic used in the continuous mode, the characteristic of the fixed ratio in which it is instantly operating at the time that said return is initialised.

The invention also provides a method of controlling a transmission control system for a vehicle, the transmission control system comprising a control means arranged in use to be capable of operation in a continuous mode in which it can vary the transmission ratio of a continuously variable transmission in a substantially continuous manner and also arranged in use to be capable of operation in a stepped mode in which it can increase said transmission ratio in steps by substantially stepped down-shifts in response to a manually operable down-shift request means, the method including operating the control means in a hybrid mode which includes making stepped down-shifts using said manually operable down-shift request means and accelerating the vehicle in the continuous mode.

The method may include entering the hybrid mode only when the control means is operating in the continuous mode.

The method may include entering the hybrid mode only on or after selecting a stepped down-shift.

The method may include entering the hybrid mode only if a predetermined hybrid mode entry condition is satisfied.

An entry condition may include one or more of: selecting a stepped down-shift while the control means is operating in the continuous mode; detecting a vehicle speed which is above a predetermined level (which may for example be 20 kph); determining a post-entry engine speed which is at least substantially equal to the pre-entry engine speed, whereby engine speed does not appear to a user to fall after entering the hybrid mode and making a stepped down-shift; and determining a post-entry engine speed which is below a predetermined level, that level being a level at which the method includes automatically decreasing the transmission ratio, whereby there is a reduced likelihood of leaving the hybrid mode shortly after entering it.

The method may include, after entering the hybrid mode, operating in the hybrid mode until one or more predetermined exit conditions is or are satisfied.

The transmission control system may further comprise a manually operable up-shift selection means and an exit condition may include one or more of: selecting manually an up-shift; detecting a vehicle speed which is below a predetermined level; detecting an engine speed which is above a predetermined level; and determining a post-exit engine speed which is higher than the existing engine speed in the hybrid mode.

The method may include returning automatically to the continuous mode if one or more of the exit conditions is or are satisfied.

The method may include, after a return to the continuous mode has been initialised, remaining in the simulated fixed ratio in which the control means is instantly operating at the time that said return is initialised, until that ratio matches a region of a continuous characteristic used in the continuous mode and changing over to the continuous mode in said region.

The method may include, after a return to the continuous mode has been initialised, adopting a merging characteristic to merge, into the continuous characteristic used in the continuous mode, the characteristic of the fixed ratio in which the control means is instantly operating at the time that said return is initialised.

The invention also provides, in a second embodiment, a transmission control system further comprising an over-run detection means in communication with the control means and arranged to detect when the vehicle is in an over-run condition, wherein the control means is arranged to enter the hybrid mode if said over-run condition is detected while the control means is operating in the continuous mode.

The control means may be arranged to return to the continuous mode when the over-run condition ceases.

The control means may be arranged to decrease the transmission ratio only in a continuous manner when operating in the continuous mode.

The control means may be arranged to maintain the transmission ratio of a selected stepped down-shift until the speed input of said transmission reaches a predetermined level and the control means is arranged to then increase the transmission ratio by the next step.

The control means may be arranged to abandon the maintenance of the selected stepped down-shift upon manual selection of the next stepped down-shift and to then reduce the transmission ratio by the next step.

The transmission control system may further comprise a selection means by which the control means can be arranged to operate only in the stepped mode and then to decrease the transmission ratio in steps by stepped up-shifts in response to a manually operable up-shift request means.

The up-shift and down-shift request means for each embodiment may be positioned in the region of a steering wheel of the vehicle.

The invention also provides a method of operating the transmission control system of the second embodiment, in which the transmission control system further comprises an over-run detection means in communication with the control means and arranged to detect when the vehicle is in an over-run condition, the method including entering the hybrid mode if said over-run condition is detected while the control means is operating in the continuous mode.

The method may include returning to the continuous mode when the over-run condition ceases.

The method may include decreasing the transmission ratio only in a continuous manner when operating in the continuous mode.

The transmission control system of either embodiment may further comprise a manually operated hybrid mode selection means which, while under selection, can be used to cause the transmission controller to enter the hybrid mode whenever it is possible to do so.

The method of either embodiment may include maintaining the transmission ratio of a selected stepped down-shift until the speed input of said transmission reaches a predetermined level and then increasing the transmission ratio by the next step.

The method may include causing the transmission controller to enter the hybrid mode whenever it is possible by selecting a manually operated hybrid mode selection means.

The invention also provides: a vehicle including a transmission control system according to the invention; a control means for a transmission control system according to the invention; and a control means arranged to operate according to the method of the invention.

BRIEF DESCRIPTION OF THE DRAWING(S)

The invention will now be described by way of example with reference to the accompanying drawings, in which.

DESCRIPTION OF THE PREFERRED EMBODIMENT(S)

Figure 1:
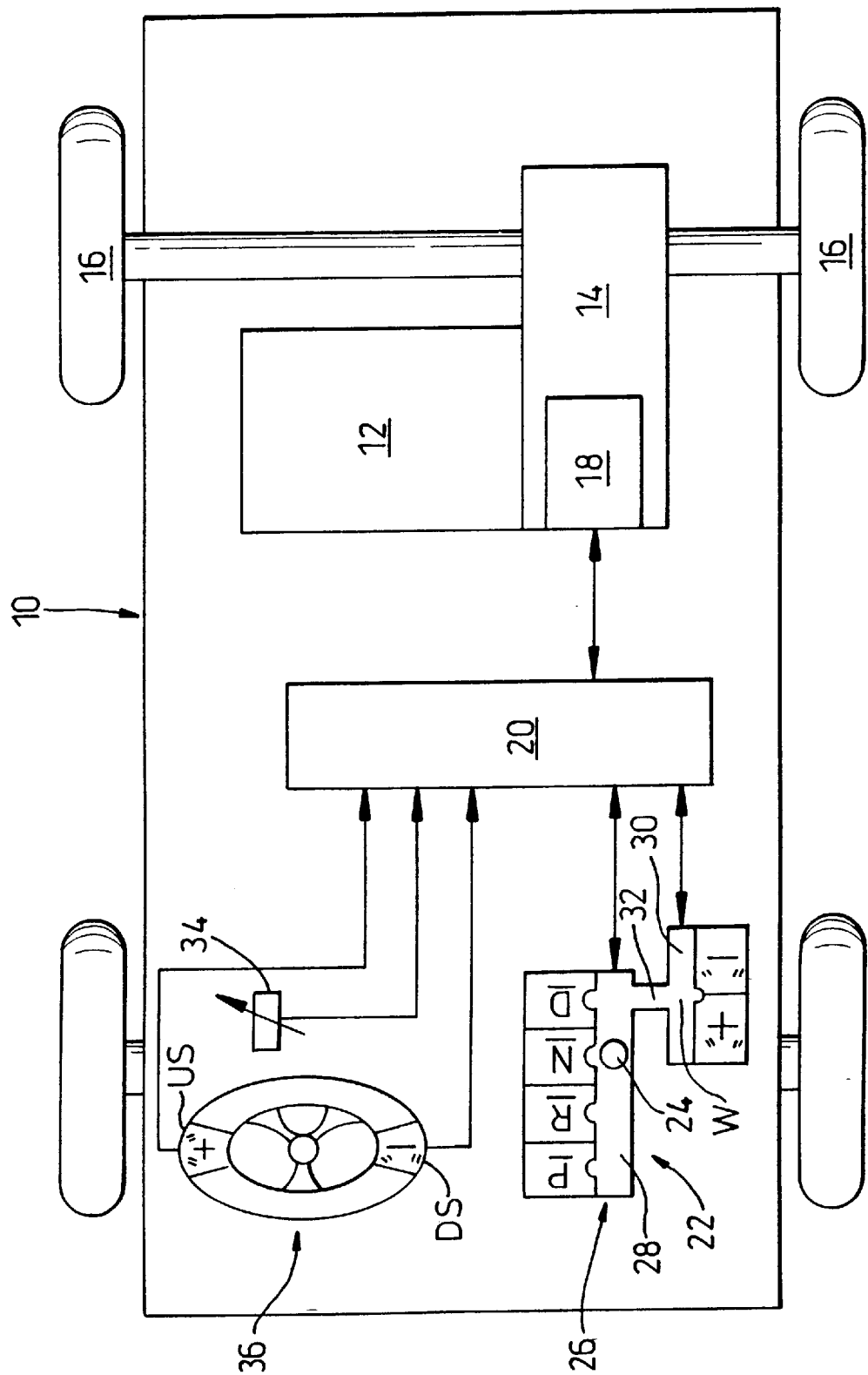
FIG. 1 is a schematic diagram of a vehicle having a transmission control system according to a first embodiment of the invention.

Referring to FIGS. 1 to 6, a vehicle 10 comprises an internal combustion engine 12 connected to a continuously variable transmission (CVT) 14 which provides drive to a set of wheels 16. The transmission ratio of the CVT 14 is varied by a transmission ratio varying mechanism 18 which is under the control of a CVT controller 20.

The CVT controller 20 can operate in a continuous mode in which the transmission ratio is varied in a substantially continuous manner or in a stepped mode in which the transmission ratio can be changed in steps between a plurality of simulated fixed ratios. The continuously variable nature of operation of the CVT 14 makes it difficult to permanently fix the CVT output at specific ratios and the CVT controller 20 simulates fixed ratios by continuously adjusting the ratio varying mechanism 18 to operate along substantially fixed ratios within the CVT output characteristic.

The CVT controller 20 receives inputs from a transmission selector 22, having a user operated selector lever 24 manually slideable between positions along a transmission gate 26 and which provides the CVT controller 20 with a signal indicating in which of the positions the selector lever 24 has been placed. The gate 26 is divided into a first track 28 and a second track 30 which are interconnected by a cross track 32.

When moved along the first track 28, the selector lever 24 is moved between the positions for: Park P, Reverse R, Neutral N and Drive D. When the selector lever 24 is in these positions P, R, N, D the CVT controller 20 operates in its continuous mode and increases or decreases the transmission ratio in a continuous manner. From the drive position D, the selector lever 24 can be moved across the cross track 32 and into the second track 30.

When the selector lever 24 is in the second track 30, it is spring loaded to a waiting position W between an up-shift "+" and a down-shift "−" position. The selector lever 24 is manually moveable into the up-shift "+" or down-shift "−" position and is returned to the waiting position W by the spring loading on its release between movements.

When the selector lever 24 is in the second track 30, the CVT controller 20 controls the varying mechanism 18 to operate the CVT 14 in the simulated fixed ratios, conveniently referred to as operation in stepped mode. To decrease the transmission ratio from one simulated fixed ratio to another, the selector lever 24 is moved into the up-shift "+" position and this operation is known as a stepped up-shift and puts the vehicle 10 into a higher (simulated) gear. To increase the transmission ratio from one simulated fixed ratio to another, the selector lever 24 is moved into the down-shift "−" position and this operation is known as a stepped down-shift and puts the vehicle 10 into a lower (simulated) gear.

The CVT controller 20 also receives a signal from an accelerator pedal position and angle sensor 34 which indicates the level of acceleration demanded by the user to be applied to the wheels 16.

The vehicle 10 further comprises a steering wheel 36 which has an up-shift-button US and a down-shift button DS mounted on it. The buttons US, DS are both connected to the CVT controller 20 and are enabled when the selector lever 24 is in the waiting position W, so as to operate in parallel with the stepped up-shifts and stepped down-shifts made using the selector lever 24.

The buttons US, DS allow the user to make manually selected stepped up-shifts and down-shifts without having to let go of the steering wheel 36 to operate the selector lever 24 in the second track 30. It would be possible to provide different arrangements of manually operated up-shift and down shift controls such as, for example, a twist-grip gear change mounted on the steering wheel, paddle type levers on the steering controls or a floor mounted switch arrangement.

When the selector lever 24 is in drive D, the CVT controller 20 varies the transmission ratio of the CVT 14 in a continuous manner to provide optimum torque to the wheels 16 to accelerate the vehicle 10 at its optimum rate, while operating the engine 12 at its peak power or peak torque point as appropriate and already known from existing CVT techniques. The rate of acceleration and engine performance is dictated by an acceleration demand signal generated by movement of the accelerator pedal and sensed by the accelerator position and angle sensor 34.

When the selector lever 24 is in drive D and the accelerator pedal is released, the CVT controller 20 starts to decrease the transmission ratio in a continuous manner in similar fashion to a conventional CVT, which provides very little engine braking.

When the CVT 14 is being operated in its stepped mode, it is possible for a user to reduce the transmission ratio in steps so as to benefit from engine braking. This effect can best be appreciated with particular reference to FIG. 2, in which the simulated fixed ratios from 1st (highest ratio, lowest gear) through to 5th (lowest ratio, highest gear) are shown as response curves of engine speed against vehicle speed within the CVT envelope. When a user steps down by simulated fixed ratios, the engine speed in RPM (revolutions per minute) increases and an engine braking effect similar to a vehicle having a manual transmission is available.

While the selector lever 24 is in D, the down-shift button DS on the steering wheel 36 can be automatically enabled by the CVT controller 20 so that the system is capable of entering a hybrid mode. The hybrid mode is entered only if the vehicle settings are configured in such a manner as to satisfy one or more predetermined hybrid mode entry conditions, as outlined in greater detail below.

In the hybrid mode, a user can make one or more stepped down-shifts using the down-shift button DS for the sake of engine braking but, when he or she accelerates, the vehicle 10 accelerates only in the continuous mode.

If no stepped down-shift is selected, the CVT controller 20 will continue to decrease the transmission ratio in a continuous manner in accordance with conventional CVT techniques in a continuous mode.

If at any time the user selects the fully stepped mode by moving the selector lever 24 into the second track 30, the CVT controller 20 selects an appropriate simulated fixed ratio and the vehicle 10 is operated using only stepped changes in transmission ratio, as described above.

If, however, the selector lever 24 is in drive D and a stepped down-shift is attempted using the down-shift button DS, the CVT controller 20 checks to establish if the entry conditions for hybrid mode are in place.

If the vehicle 10 is stationary or is travelling at a speed below a predetermined level, set for example in the order of 20 kph and which relates to the hybrid mode exit conditions described below, the CVT controller 20 does not enter hybrid mode and ignores the request for the stepped down-shift. This is because, if the CVT controller 20 allows entry to the hybrid mode under such conditions, the system will automatically revert to continuous mode very quickly and user annoyance is likely to occur. In other words, the check on the vehicle speed protects the system against entering hybrid mode and straight into one of the exit conditions which causes it to revert to continuous mode (please see the description of the exit conditions outlined below).

The next stage of entry condition validation is the calculation of the engine speed in the hybrid mode, to ensure that the engine speed would at least remain the same, or more preferably rise on entry, in order to provide the engine braking.

The last check for validating the entry conditions is to ensure that the engine speed which would be adopted in hybrid mode would not be so high that the CVT controller 20 would be forced to carry out an automatic up-shift or return to continuous mode in order to prevent engine damage.

Figure 2:
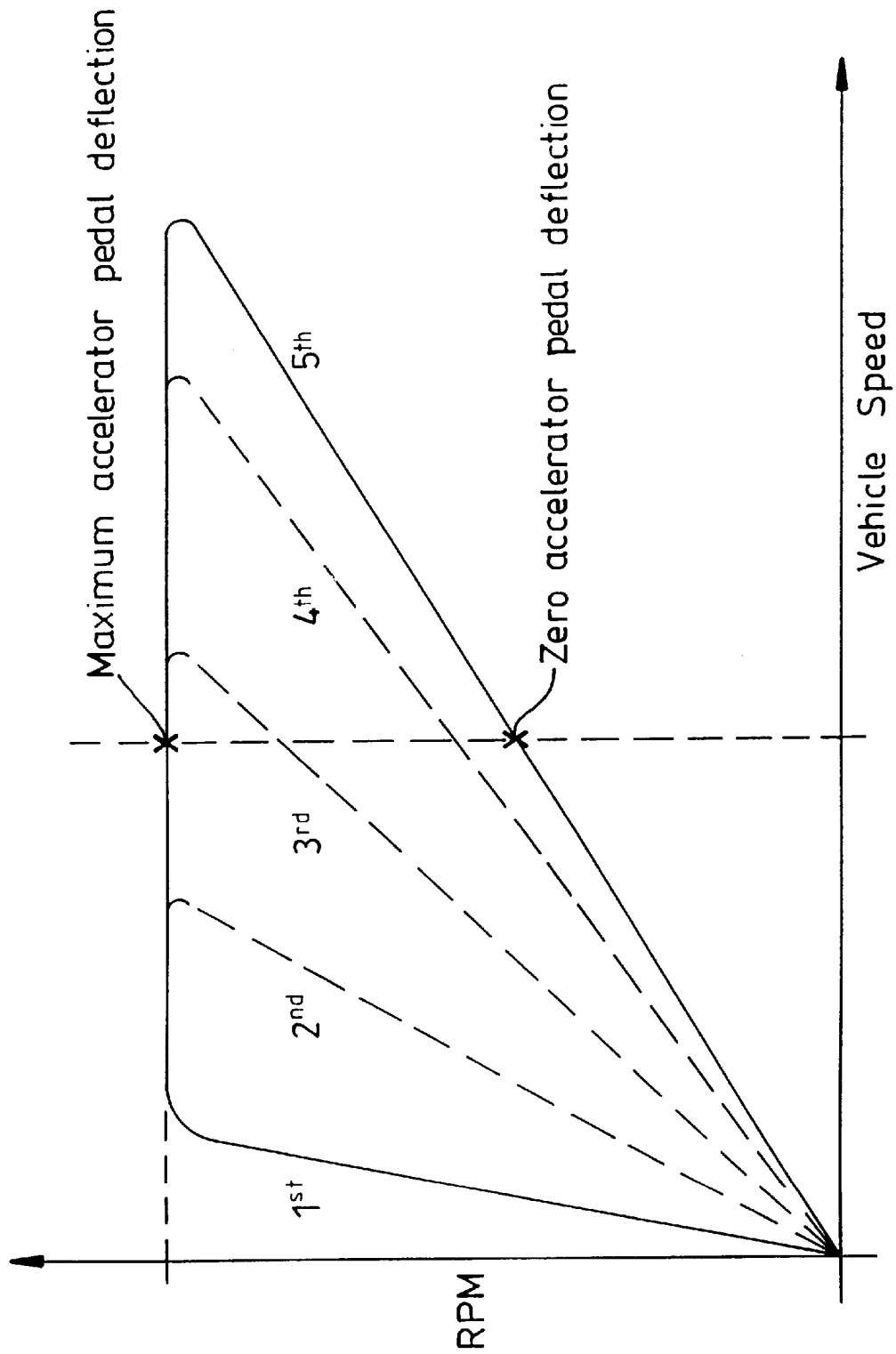
FIG. 2 is a graphical representation, in the form of engine speed against vehicle speed, of a transmission characteristic of the vehicle of FIG. 1.
Figure 3:
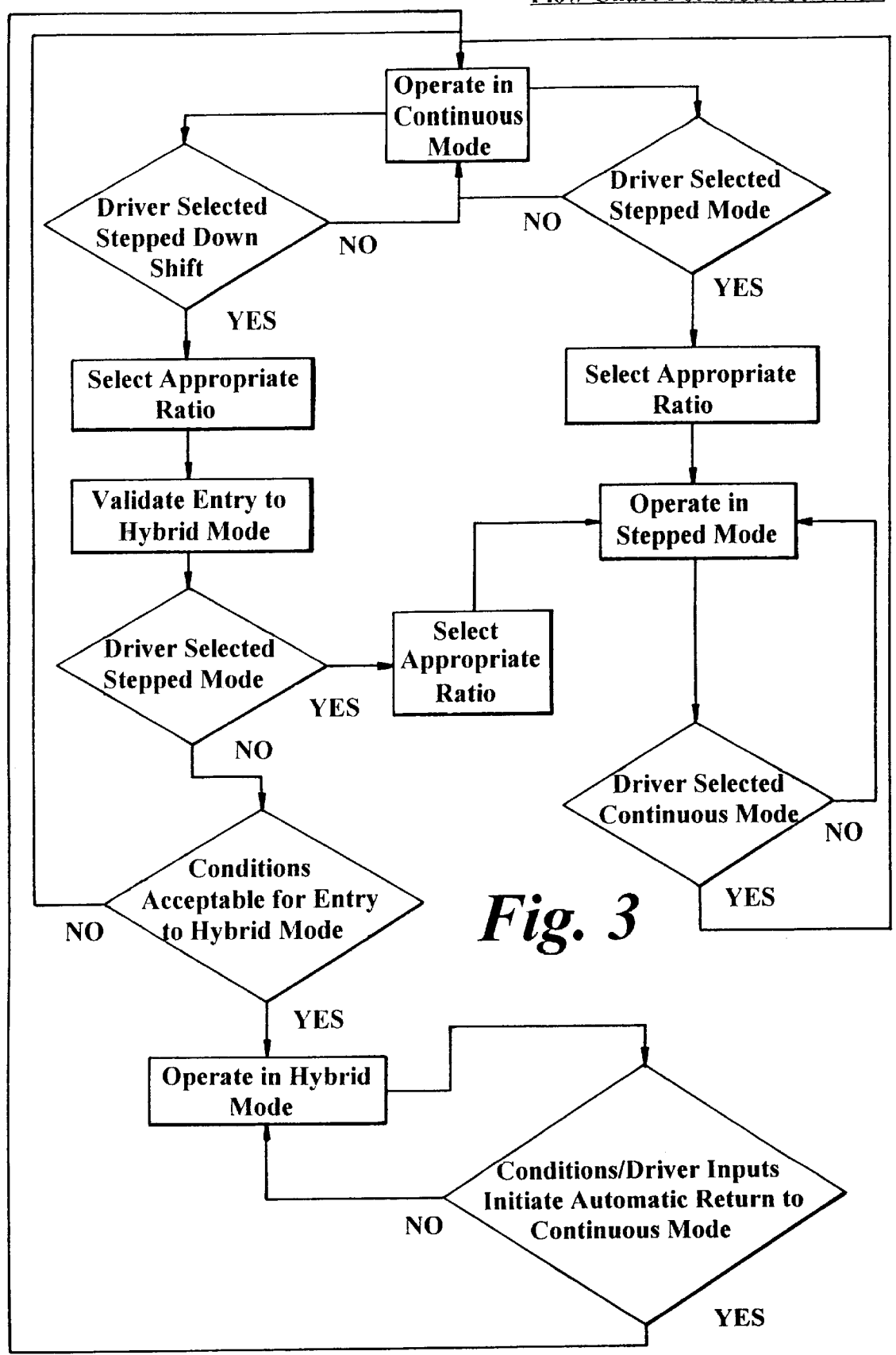
FIG. 3 is a high level flow chart of a control method of the vehicle of FIG. 1.
Figure 4:
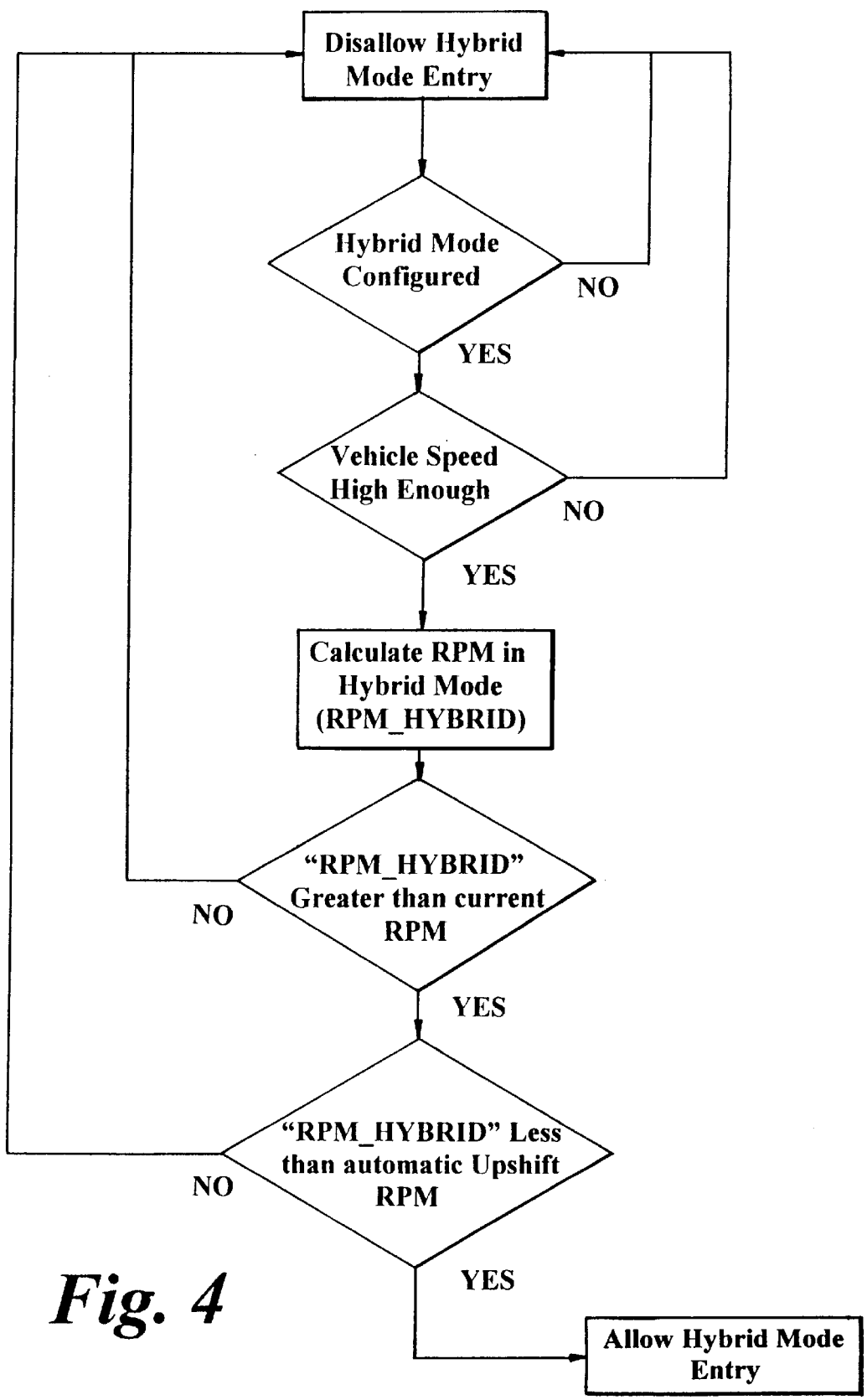
FIG. 4 is a flow chart of a subroutine of the control method of FIG. 3.
Figure 5:
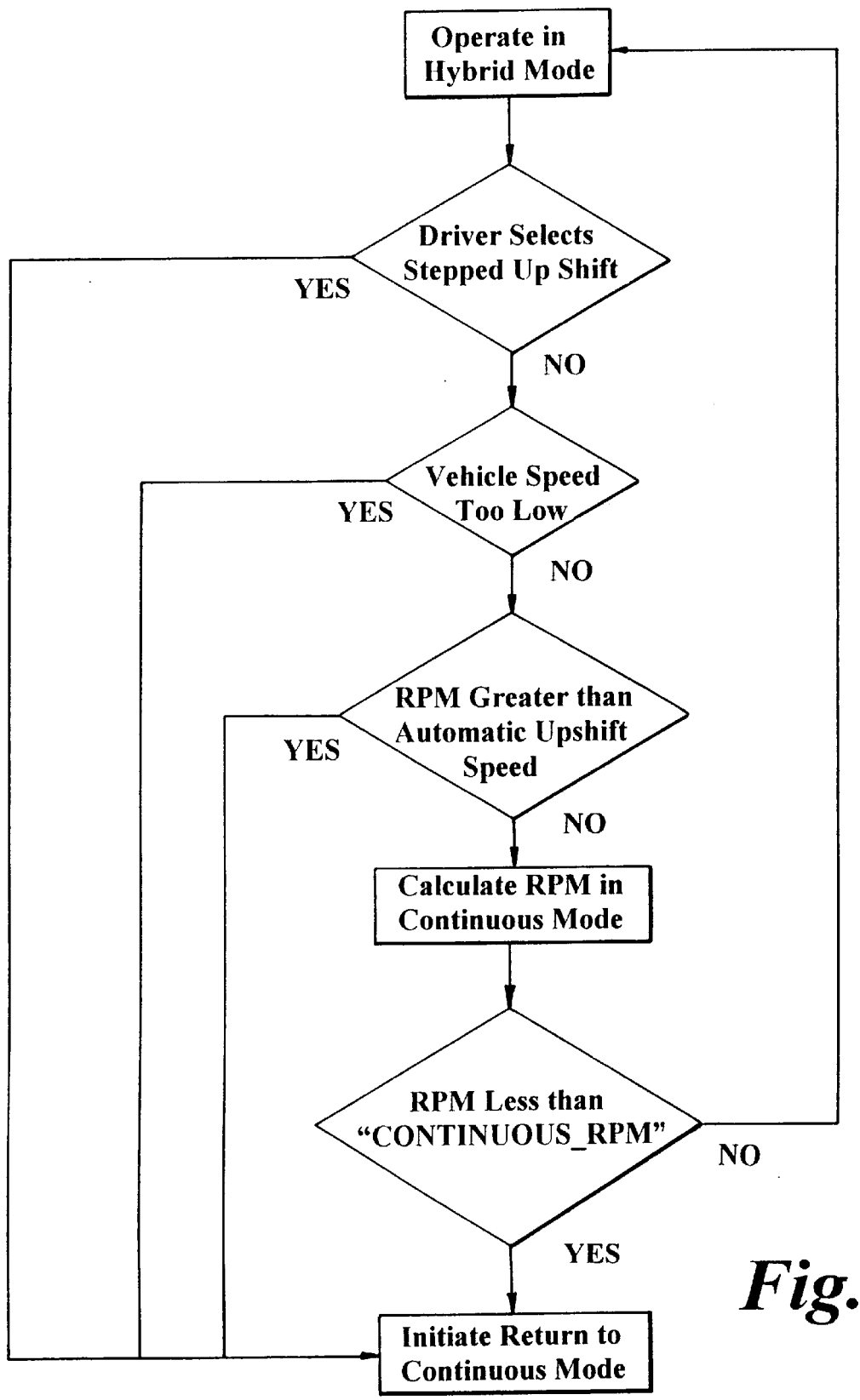
FIG. 5 is a flow chart of a subroutine of the control method of FIG. 3.
Figure 6:
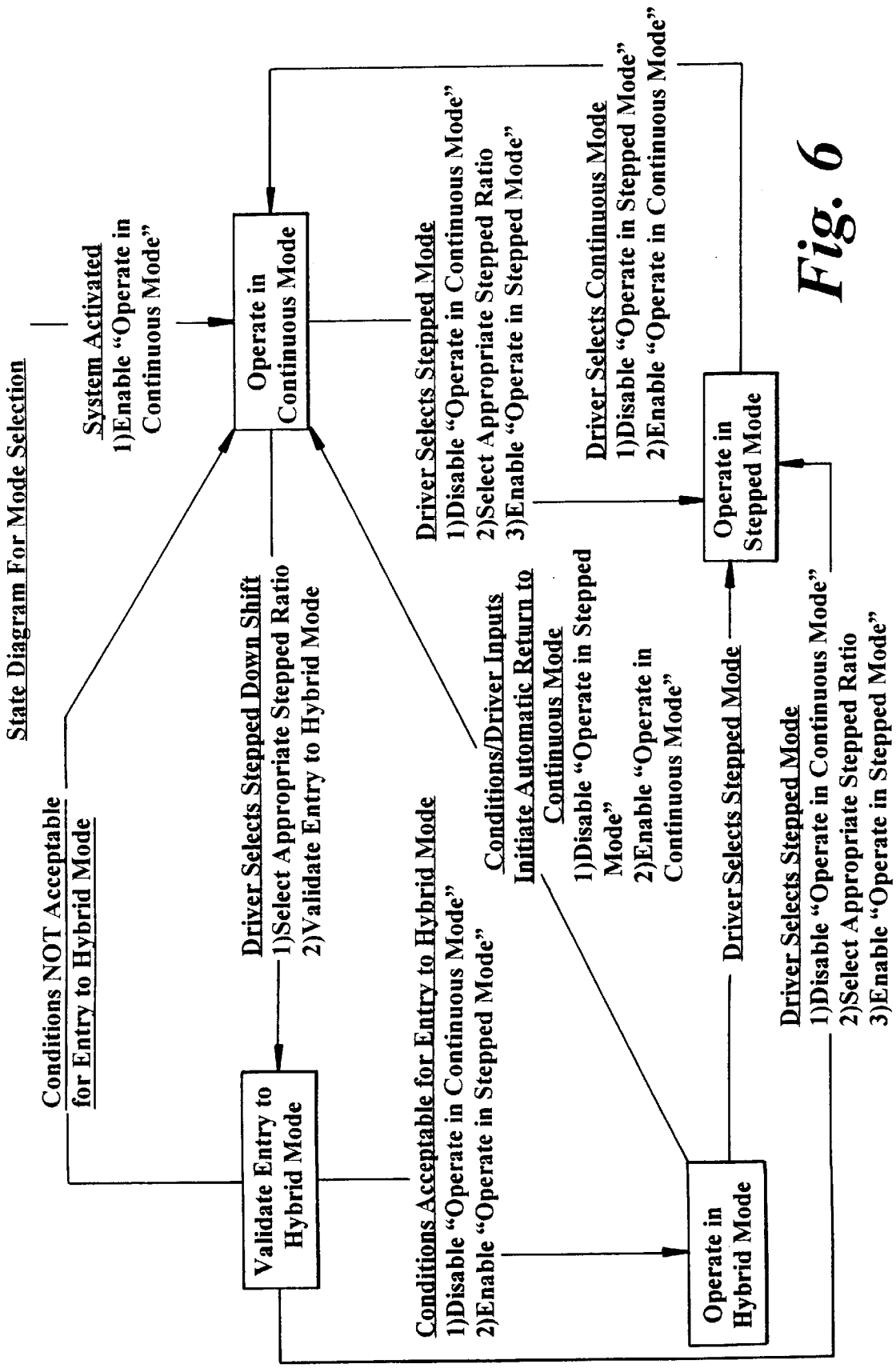
FIG. 6 is a state diagram which equates to the flow charts of FIGS. 3 to 5.

One reason for the need to validate the entry conditions to hybrid mode relates to the expected user perceptions of such a feature and can best be explained using the graph of FIG. 2. The CVT ratio in continuous mode in this embodiment is mapped against the accelerator angle and vehicle speed and a line is provided on the graph of FIG. 2 which shows the range of engine speed (RPM) over substantially full scale effective deflection of the sensor 34 for a substantially fixed vehicle speed. It will be appreciated by the person skilled in the art that it is possible to use other relationships to map the CVT ratio in continuous mode and/or in stepped mode.

It can thus be seen that, although on a down-shift by a simulated fixed ratio the engine speed will be seen to rise, when the user accelerates the engine speed may be seen to drop. Even though the vehicle 10 accelerates, the drop in engine speed may confuse or irritate some users. This problem is likely to occur if the system is arranged to switch back to the continuous mode for acceleration at any accelerator pedal angle.

After confirming that the system is configured for operation in hybrid mode and validating the entry conditions, but before entering the hybrid mode, the CVT controller 20 checks to see if the user has decided to select the fully stepped mode by moving the selector lever 24 from drive D into the second track 30. If the user has done this, then the fully stepped mode is adopted rather than the hybrid mode.

If the user has not selected stepped mode and the entry conditions for hybrid mode are met, then the vehicle 10 enters hybrid mode and stepped down-shifts can be made to provide engine braking.

To switch back from hybrid mode to continuous mode, one or more of a set of exit conditions must be met, which comprise the following:

if the user presses the up-shift-button US, a return to the continuous mode is initiated;

if the vehicle speed is too low, then a return to the continuous mode is initiated; or if the engine speed is above a predetermined threshold at which the CVT controller 20 is set to make an automatic return to continuous mode in order to prevent engine damage, then a return to continuous mode is initiated.

Once a return to the continuous mode has been initiated, the vehicle 10 will stay in the selected gear until the characteristic of that simulated fixed ratio crosses or meets the continuous mode CVT characteristic. In the region of the cross-over point, the CVT controller 20 will change over from the simulated fixed ratio to the continuous characteristic. This is done so as to prevent a step change in ratio, which might occur if an instant changeover was made as soon as a user demanded acceleration.

It would also be possible to implement a merging sub-routine during the change back to the continuous mode. Such a merging characteristic could be arranged to merge the slope of the simulated fixed ratio towards the slope of the continuous mode CVT characteristic, so that there would be a smoother change-over at the cross-over point.

The vehicle speed is used as an exit condition so as to reduce the likelihood that a user might forget that he or she has entered the hybrid mode and thinks that they are in the stepped mode for a subsequent pull-away. Such a situation could arise if the vehicle 10 was stuck in a traffic jam for a long period. If the user has in fact entered the stepped mode, then the vehicle 10 will remain in stepped mode for the pull-away and subsequent acceleration.

Finally, if none of the above defined exit conditions apply but the engine speed while operating in hybrid mode is calculated to be below the engine speed in continuous mode, then a return to the continuous mode is initiated.

If the user selects a further down-shift manually, subsequently to his first selection, the CVT controller 20 abandons the maintenance of the presently used simulated fixed ratio and performs the next stepped down-shift. In this manner, the user can manually index his or her way through the simulated fixed ratios by stepped down-shifts so as to provide the desired level of engine braking.

Figure 7:
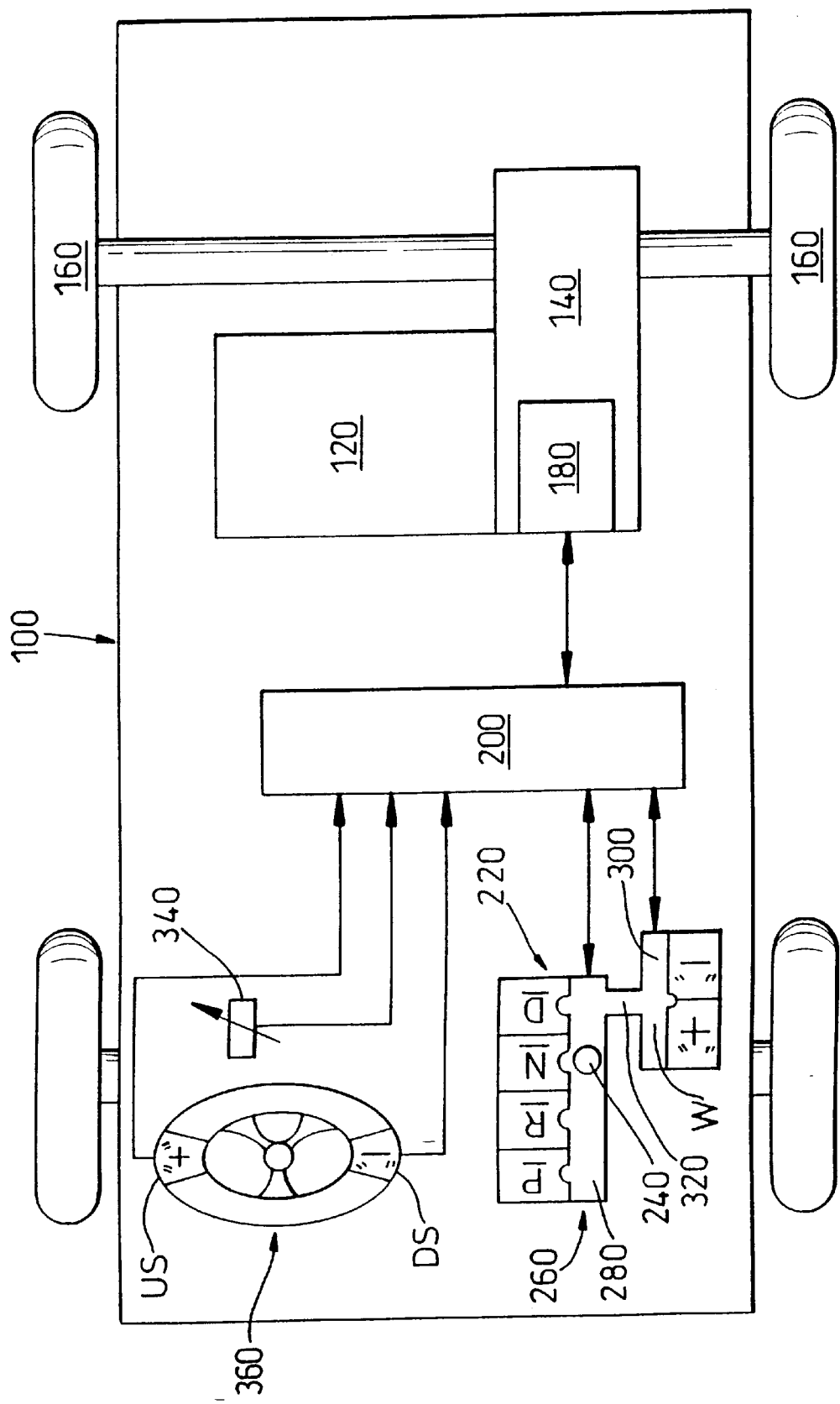
FIG. 7 is a schematic diagram of a vehicle having a transmission control system according to a second embodiment of the invention.

Referring now to FIG. 7, in a second embodiment of the invention, a vehicle 100 comprises an internal combustion engine 120 connected to a continuously variable transmission (CVT) 140 which provides drive to a set of wheels 160. The transmission ratio of the CVT 140 is varied by a transmission ratio varying mechanism 180 which is under the control of a CVT controller 200.

The CVT controller 200 can operate in a continuous mode in which the transmission ratio is varied in a continuous manner or in a stepped mode in which the transmission ratio can be changed in steps between a plurality of simulated fixed ratios. The continuously variable nature of operation of the CVT 140 makes it difficult to permanently fix the CVT output at specific ratios and the CVT controller 200 simulates fixed ratios by continuously adjusting the ratio varying mechanism 180 to operate along substantially fixed ratios within the CVT output characteristic.

The CVT controller 200 receives inputs from a transmission selector 220, having a user operated selector lever 240 manually slideable between positions along a transmission gate 260 and which provides the CVT controller 200 with a signal indicating in which of the positions the selector lever 240 has been placed. The gate 260 is divided into a first track 280 and a second track 300 which are interconnected by a cross track 320.

When moved along the first track 280, the selector lever 240 is moved between the positions for: Park P, Reverse R, Neutral N and Drive D. When the selector lever 240 is in these positions P, R, N, D the CVT controller operates in its continuous mode and increases or decreases the transmission ratio in a continuous manner. From the drive position D, the selector lever 240 can be moved across the cross track 320 and into the second track 300.

When the selector lever 240 is in the second track 300, it is spring loaded to a waiting position W between an up-shift "+" and a down-shift "−" position. The selector lever 240 is manually moveable into the up-shift "+" or down-shift "−" position and is returned to the waiting position W by the spring loading on its release between movements.

When the selector lever 240 is in the second track 300, the CVT controller 200 controls the varying mechanism 180 to operate the CVT 140 in the simulated fixed ratios. To decrease the transmission ratio from one simulated fixed ratio to another, the selector lever 240 is moved into the up-shift "+" position and this operation is known as a stepped up-shift. To increase the transmission ratio from one simulated fixed ratio to another, the selector lever 240 is moved into the down-shift "−" position and this operation is known as a stepped down-shift.

The CVT controller 200 also receives a signal from an accelerator pedal position and angle sensor 340 which indicates the level of acceleration demanded by the user to be applied to the wheels 160. The accelerator pedal sensor 340 is also used by the CVT controller 200 to determine an over-run condition, which occurs for example when the user lifts his or her foot off the accelerator pedal (not shown) on the approach to a bend or to a roundabout. The reader is referred to U.S. Pat. No. 5,527,231 and U.S. Pat. No. 5,527,232, both of which disclose a known method of determining an over-run condition using such a technique.

The vehicle 100 further comprises a steering wheel 360 which has an up-shift-button US and a down-shift button DS mounted on it. The buttons US, DS are both connected to the CVT controller 200 and are enabled when the selector lever 240 is in the waiting position W, so as to operate in parallel with the stepped up-shifts and stepped down-shifts made using the selector lever 240. The buttons US, DS allow the user to make manually selected stepped up-shifts and down-shifts without having to let go of the steering wheel 360 to operate the selector lever 240 in the second track 300. It would be possible to provide different arrangements of manually operated up-shift and down shift controls such as, for example, a twist-grip gear change mounted on the steering wheel, paddle type levers on the steering controls or a floor mounted switch arrangement.

When the selector lever 240 is in drive D, the CVT controller 200 varies the transmission ratio of the CVT 140 in a continuous manner to provide optimum torque to the wheels 160 to accelerate the vehicle 100 at its optimum rate, while operating the engine 120 at its peak power point. The rate of acceleration and engine performance is dictated by an acceleration demand signal generated by movement of the accelerator pedal and sensed by the sensor 340.

When the selector lever 240 is in drive D and the accelerator pedal is released, the CVT controller 200 starts to decrease the transmission ratio in a continuous manner in similar fashion to a conventional CVT, which provides very little engine braking.

When the selector lever 240 is in drive D and an over-run condition is detected, however, the down-shift button DS on the steering wheel 360 is enabled so as to permit manual selection of stepped down-shifts during over-run. Under these circumstances, i.e. the selector lever 240 in drive D and the down-shift button DS enabled, the vehicle 100 is said to be operating in a hybrid mode as it is mixing continuous and stepped operation.

If no stepped down-shift is selected, the CVT controller 200 will continue to decrease the transmission ratio in a continuous manner in accordance with conventional CVT techniques. If a stepped down-shift is selected using the down-shift button DS, the CVT controller 200 reduces the transmission ratio to the simulated fixed ratio which is below the instant ratio and does so substantially in one step.

The new transmission ratio is then maintained by the CVT controller 200 until the engine speed has fallen to a predetermined level approaching its idle speed, upon which the CVT controller 200 automatically increases the transmission ratio by the next step. This further reduction in transmission ratio causes the engine speed to rise and the new ratio is maintained until the engine speed again falls to a level at which the CVT controller 200 determines it is necessary to make the next stepped down-shift, thereby continuing the provision of engine braking.

If the user selects a further down-shift manually, subsequently to his or her first selection and before the engine speed has reduced to the predetermined level at which the CVT controller 200 will automatically perform the next stepped down-shift, the CVT controller abandons the maintenance of the presently used simulated fixed ratio and performs the next stepped down-shift. In this manner, the user can manually index his or her way through the simulated fixed ratios by stepped down-shifts so as to provide his or her desired level of engine braking.

The selection of further stepped down-shifts by the user is limited by the CVT controller 200 if selection of the next stepped down-shift would cause the engine to enter an over-speed condition. In this case, the CVT controller 200 would perform the appropriate down-shift as soon as the selected fixed ratio and the engine speed could be suitably matched to prevent engine over-speed on down-shifting.

If the accelerator pedal is depressed, the CVT controller 200 abandons the hybrid mode, i.e. it 200 ignores the down-shift button DS and reverts to operation in the continuous mode. The CVT controller 200 varies the transmission ratio to bring the engine speed up or down, as appropriate, to its optimum power point and then varies the transmission ratio in a continuous manner to accelerate the vehicle 100.

It can be seen that at all times when the selector lever 240 is in the drive position D, the vehicle 100 is accelerated only by varying the transmission ratio in a continuous manner.

In a modification to either embodiment of the invention, the transmission selector 22, 220 is replaced by one which has no cross track 32, 320 or second track 30, 300. When in drive D, a separate control button is used to switch the CVT controller 20, 200 to operate the CVT 14, 140 in the hybrid mode. In this modification, if the control button is selected, when the vehicle is in drive D and the entry conditions for hybrid mode are met or an over-run condition is detected (as appropriate), the down-shift button DS on the steering wheel 36, 360 is enabled in similar fashion to the relevant unmodified version, to provide the option of using the hybrid mode and making stepped down-shifts to provide engine braking, yet still accelerating only by varying the transmission ratio in a continuous manner.

One example of the use of this invention is the provision of optional manually performed stepped down-shifts on the approach to a bend or roundabout while retaining the advantage of accelerating away from the hazard at the optimum rate. This is achieved by either embodiment without having to move the selector lever 24, 240 into the second track 30, 300 each time the user wishes to perform a stepped down-shift and then back into the drive position D in the first track 28, 280 as soon as he or she wants to accelerate and is instead achieved without the user having to let go of the steering wheel 36, 360.

It can be seen quite clearly that this invention improves vehicle efficiency, road safety, user convenience and user enjoyment, as it improves user control over the vehicle 10, 100 by allowing more time with both hands on the steering wheel 36, 360. Furthermore, the invention also has advantageous applications in motorsport for much of the same reasoning.

We claim:

1. A transmission control system for a vehicle, said control system comprising:

a) a transmission having a variable transmission ratio;

b) a control means for varying said transmission ratio; and c) a manually operable stepped down-shift request means for commanding desired stepped downs, said control means being arranged, during use, to vary said transmission ratio in a substantially continuous manner and also being arranged, during use, to increase said transmission ratio in steps by substantially stepped down-shifts in response to said manually operable down-shift request means, wherein said control means is arranged, during use, for operation in a hybrid mode in which stepped downshifts can be made using said manually operable downshift request means and acceleration of said vehicle is performed by operation in said continuous manner.

2. The transmission control system according to claim 1, wherein said hybrid mode can be entered only when said control means is operating in said continuous manner.

3. The transmission control system according to claim 1, wherein said hybrid mode can be entered only on or after selection of said stepped down-shift while said control means is operating in said continuous manner.

4. The transmission control system according to claim 1, wherein said hybrid mode has at least one predetermined entry condition and said hybrid mode can be entered only if said at least one predetermined entry condition is satisfied.

5. The transmission control system according to claim 4, wherein said control means further comprises a vehicle speed determining means for determining a vehicle speed and said at least one predetermined entry condition includes a determination by said control means of said vehicle speed above a predetermined level.

6. The transmission control system according to claim 4, wherein said vehicle further comprises an engine and said control means further comprises an engine speed determining means for determining an engine speed so as to distinguish between a pre-entry speed, which is the engine speed before said control means enters said hybrid mode, and a post-entry speed, which is the engine speed after said control means enters said hybrid mode, and said at least one predetermined entry condition includes the determination of said post-entry speed which is at least substantially equal to said pre-entry speed, whereby there is a reduced possibility that said post-entry speed will appear to fall after said hybrid mode is entered and said stepped down-shift is made.

7. The transmission control system according to claim 4, wherein said vehicle further comprises an engine and said control means further comprises an engine speed determining means for determining an engine speed so as to distinguish between a pre-entry speed, which is the engine speed before said control means enters said hybrid mode, and a post-entry speed, which is the engine speed after said control means enters said hybrid mode, and said entry condition includes the determination of said post-entry engine speed below a predetermined level, said predetermined level is a level at which said control means is arranged to automatically decrease said transmission ratio, whereby there is a reduced possibility that said transmission control system will automatically exit said hybrid mode shortly after entering said hybrid mode.

8. The transmission control system according to claim 1, wherein said hybrid mode has at least one predetermined hybrid mode exit condition and said control means is arranged, after entry to said hybrid mode, to continue to operate in said hybrid mode until said at least one predetermined hybrid mode exit condition is satisfied.

9. The transmission control system according to claim 8, wherein said transmission control system further comprises a manually operable up-shift selection means for selecting up-shifts and said at least one exit condition includes a manual selection of an up-shift using said up-shift selection means.

10. The transmission control system according to claim 8, wherein said control means further comprises a vehicle speed determining means for determining a vehicle speed and said at least one exit condition includes said vehicle speed which is below a predetermined level.

11. The transmission control system according to claim 8, wherein said control means further comprises an engine speed determining means for determining an engine speed and said at least one exit condition includes said engine speed which is above a predetermined level.

12. The transmission control system according to claim 8, wherein said vile further comprising an engine and said control means further comprises an engine speed determining means for determining a post-exit engine speed and said at least one exit condition includes said post-exit engine speed which is higher than an existing engine speed in said hybrid mode, said post-exit engine speed comprises a speed of said engine after said control means has exited said hybrid mode.

13. The transmission control system according to claim 8, wherein said control means is arranged to return automatically to operating said transmission ratio in said continuous manner if at least one of said exit condition is satisfied.

14. The transmission control system according to claim 8, wherein said control means is arranged to operate said transmission ratio in said continuous manner substantially in accordance with a continuous operating characteristic and said control means is arranged, after a return from said hybrid mode to operate said transmission ratio in said continuous manner has been initialized, to remain in a simulated fixed ratio in which said control means is instantly operating at a time that said return is initialized until said simulated fixed ratio substantially matches a region of said continuous operating characteristic and thereafter to change over to operate said transmission ratio in the continuous manner in accordance with said continuous operating characteristic in said region.

15. The transmission control system according to claim 9, wherein said control means comprises a merging characteristic for merging from the hybrid mode into operating said transmission ratio in said continuous characteristic and after said return is initialized, said control means is arranged to adopt said merging characteristic to merge, into said continuous operating characteristic, said fixed ratio in which said control means is instantly operating at the time that said return is initialized.

16. The transmission control system according to claim 1, wherein said transmission control system further comprises a manually operated hybrid mode selection means for causing said control means to enter said hybrid mode.

17. The transmission control system according to claim 1, wherein said transmission control system further comprising an over-run detection means in communication with said control means and arranged during use to detect when said vehicle is in an over-run condition, and said control means is arranged during use to enter said hybrid mode if said over-run condition is detected while said control means is operating in said continuous manner.

18. The transmission control system according to claim 17, wherein said control means is arranged to return to operate said transmission ratio in said continuous manner when said over-run condition ceases.

19. The transmission control system according to claim 17, wherein said control means is capable of operating in a continuous mode in which said control means is arranged to decrease said transmission ratio only in said continuous manner.

20. The transmission control system according to claim 17, wherein said control means is arranged to maintain said transmission ratio of said selected stepped down-shift until a speed input of said transmission reaches a predetermined level and said control means is arranged to then increase said transmission ratio by the next stepped ratio.

21. The transmission control system according to claim 17, wherein said control means is arranged to abandon maintenance of said selected stepped down-shift upon a manual selection of a next stepped down-shift and to then reduce said transmission ratio by the next stepped ratio.

22. The transmission control system according to claim 17, wherein said transmission control system further comprises a stepped mode selection means for selecting a stepped mode which said control means is arranged during use to operate only in said stepped mode, and also further comprises a manually operated stepped mode up-shift selection means for selecting stepped up shifts, whereby said control means can be arranged during use to decrease said transmission ratio in steps by stepped up-shifts in response to said manually operated stepped mode up-shift selection means.

23. The transmission control system according to claim 17, wherein said transmission control system further comprises a manually operated hybrid mode selection means for causing said control means to enter said hybrid mode.

24. The transmission control system according to claim 1, wherein said vehicle further comprises a steering wheel and said down-shift request means are positioned in the region of said steering wheel.

25. A method of controlling a transmission control system for a vehicle, said control system comprising: a transmission having a variable transmission ratio; a control means for varying said transmission ratio; and a manually operable stepped down-shift request means for commanding desired stepped downs, said control means being arranged during use to vary said transmission ratio in a substantially continuous manner and also being arranged during use to increase said transmission ratio in steps by substantially stepped down-shifts in response to said manually operable down-shift request means, the method including operating said control means in a hybrid mode which includes making stepped down-shifts using said manually operable down-shift request means and which includes accelerating said vehicle by operating said transmission ratio in said continuous manner.

26. The method according to claim 25, further comprising the step of entering said hybrid mode only when said control means is operating in said continuous manner.

27. The method according to claim 25, further comprising the step of entering said hybrid mode only on or after selecting said stepped down-shift.

28. The method according to claim 25, further comprising the step of said hybrid mode having at least one predetermined entry condition, and entering said hybrid mode only if said at least one predetermined entry condition is satisfied.

29. The method according to claim 28, wherein said control means further comprises a vehicle speed determining means for determining a vehicle speed and said at least one entry condition including determining said vehicle speed which is above a predetermined level.

30. The method according to claim 29, wherein said vehicle further comprises an engine and said control means further comprises an engine speed determining means for determining an engine speed so as to distinguish between a pre-entry speed, which is the engine speed before said control means enters said hybrid mode, and said post-entry speed, which is the engine speed after said control means enters said hybrid mode, said at least one entry condition including determining said post-entry speed which is at least substantially equal to said pre-entry speed, whereby engine speed does not appear to fall after entering said hybrid mode and making said stepped down-shift.

31. The method according to claim 28, wherein said vehicle further comprises an engine and said control means further comprises an engine speed determining means for determining an engine speed so as to distinguish between a pre-entry speed, which is the engine speed before said control means enters said hybrid mode, and a post-entry speed, which is the engine speed after said control means enters said hybrid mode, said at least one entry condition including determining a post-entry speed which is below a predetermined level, said predetermined level being a level at which the method includes automatically decreasing said transmission ratio, whereby there is a reduced possibility of exiting said hybrid mode shortly after entering said hybrid mode.

32. The method according to claim 25, wherein said hybrid mode has at least one predetermined exit condition, the method including, after entering said hybrid mode, operating in said hybrid mode until said at least one predetermined exit condition is satisfied.

33. The method according to claim 32, wherein said transmission control system further comprises a manually operable up-shift selection means for selecting up shifts and said at least one predetermined exit condition including selecting manually an upshift using said up-shift selection means.

34. The method according to claim 32, wherein said vehicle further comprises a vehicle speed determining means for determining a vehicle speed, said at least one predetermined exit condition including determining said vehicle speed which is below a predetermined level.

35. The method according to claim 32, wherein said vehicle further comprises an engine speed determining means for determining engine speed, said at lest one predetermined exit condition including determining said engine speed which is above a predetermined level.

36. The method according to claim 32, wherein said vehicle further comprises an engine speed determining means for determining a post-exit engine speed, and said at least one predetermined exit condition including determining said post-exit engine speed which is higher than an existing engine speed in said hybrid mode.

37. The method according to claim 32, further comprising the step of returning automatically to operating said transmission ratio in said continuous manner if said at least one exit condition is satisfied.

38. The method according to claim 32, wherein said control means is arranged to operate said transmission ratio in the continuous manner substantially in accordance with a continuous operating characteristic, the method including, after a return to operate said transmission ratio in said continuous manner has been initialized, remaining in a simulated fixed ratio in which said control means is instantly operating at a time that said return is initialized until said simulate fixed ratio substantially matches a region of said continuous operating characteristic and changing over to operating said transmission ratio in said continuous manner in accordance with said continuous operating characteristic in said region.

39. The method according to claim 38, wherein said control means comprises a merging characteristic for merging from the hybrid mode into said continuous operating characteristic, the method including, after said return being initialized, adopting said merging characteristic to merge, into said continuous operating characteristic used while operating in said continuous manner, said fixed ratio in which said control means is instantly operating at the time that said return is initialized.

40. The method according to claim 25, wherein said control means further comprises a manually operated hybrid mode selection means for causing said control means to enter said hybrid mode.

41. The method according to claim 25, wherein said transmission control system further comprises an over-run detection means in communication with said control means and arranged during use to detect when said vehicle is in an over-run condition, and the method including entering said hybrid mode if said over-run condition is detected while said control means is operating in said continuous manner.

42. The method according to claim 41, further comprising the step of returning to operate said transmission ratio in said continuous manner when said over-run condition ceases.

43. The method according to claim 41, wherein said control means is capable of operating in a continuous mode, and the method including decreasing, while operating in said continuous mode, said transmission ratio only in said continuous manner.

44. The method according to claim 41, further comprising the step of maintaining the transmission ratio of said selected stepped down-shift until a speed input of said transmission reaches a predetermined level and then increasing said transmission ratio by the next stepped ratio.

45. The method according to claim 41, wherein said vehicle further comprises a manually operated hybrid mode selection means for causing said transmission controller to enter said hybrid mode.

* * * * *